(12) United States Patent
Noyes

(10) Patent No.: US 8,713,223 B2
(45) Date of Patent: Apr. 29, 2014

(54) METHODS AND SYSTEMS TO ACCOMPLISH VARIABLE WIDTH DATA INPUT

(75) Inventor: Harold B Noyes, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 13/599,173

(22) Filed: Aug. 30, 2012

(65) Prior Publication Data

US 2012/0324130 A1    Dec. 20, 2012

Related U.S. Application Data

(63) Continuation of application No. 13/169,979, filed on Jun. 27, 2011, now Pat. No. 8,260,987, which is a continuation of application No. 12/265,421, filed on Nov. 5, 2008, now Pat. No. 7,970,964.

(51) Int. Cl.
*G06F 13/12* (2006.01)
*H03M 13/00* (2006.01)
*G06F 13/38* (2006.01)

(52) U.S. Cl.
CPC .................................... *G06F 13/385* (2013.01)
USPC ............................... 710/65; 710/66; 714/758

(58) Field of Classification Search
None
See application file for complete search history.

(56) References Cited

U.S. PATENT DOCUMENTS

| 5,300,830 | A  | 4/1994  | Hawes |
| 5,331,227 | A  | 7/1994  | Hawes |
| 5,528,550 | A  | 6/1996  | Pawate et al. |
| 6,240,003 | B1 | 5/2001  | McElroy |
| 6,880,087 | B1 | 4/2005  | Carter |
| 6,906,938 | B2 | 6/2005  | Kaginele |
| 6,944,710 | B2 | 9/2005  | Regev et al. |
| 7,089,352 | B2 | 8/2006  | Regev et al. |
| 7,146,643 | B2 | 12/2006 | Dapp et al. |
| 7,293,123 | B2 | 11/2007 | Tate |
| 7,392,229 | B2 | 6/2008  | Harris et al. |
| 7,487,131 | B2 | 2/2009  | Harris et al. |
| 7,487,542 | B2 | 2/2009  | Boulanger |
| 7,574,541 | B2 | 8/2009  | Liav et al. |
| 7,774,286 | B1 | 8/2010  | Harris |
| 7,917,684 | B2 | 3/2011  | Noyes et al. |

(Continued)

FOREIGN PATENT DOCUMENTS

EP    0562746       9/1993
TW    200734866 A   9/2007

OTHER PUBLICATIONS

Beesley, K. R.; Arabic Morphology Using Only Finite-State Operations; Xerox Research Centre Europe; pp. 50-57.

(Continued)

*Primary Examiner* — Alan Chen
(74) *Attorney, Agent, or Firm* — Fletcher Yoder, P.C.

(57) ABSTRACT

Disclosed are methods and systems for variable width data input to a pattern-recognition processor. A variable width data input method may include receiving bytes over a data bus having a first width and receiving one or more signals indicating the validity of each of the one or more bytes. The valid bytes may be sequentially provided to a pattern-recognition processor in an 8-bit wide data stream. In an embodiment, a system may include one or more address lines configured to provide the one or more signals indicating the validity of the bytes transferred over the data bus. The system may include a buffer and control logic to sequentially process the valid bytes.

12 Claims, 15 Drawing Sheets

(56) References Cited

U.S. PATENT DOCUMENTS

| | | | |
|---|---|---|---|
| 8,065,249 | B1 | 11/2011 | Harris |
| 2003/0051043 | A1* | 3/2003 | Wyschogrod et al. ......... 709/230 |
| 2004/0190506 | A1* | 9/2004 | Davis et al. .................... 370/389 |
| 2005/0050237 | A1 | 3/2005 | Jeddeloh |
| 2005/0146943 | A1 | 7/2005 | Jeddeloh |
| 2005/0146944 | A1 | 7/2005 | Jeddeloh |
| 2006/0218332 | A1 | 9/2006 | Boudreau |
| 2007/0075878 | A1 | 4/2007 | Furodet et al. |
| 2007/0127482 | A1 | 6/2007 | Harris et al. |
| 2007/0282833 | A1 | 12/2007 | McMillen et al. |
| 2010/0100691 | A1 | 4/2010 | Noyes et al. |
| 2010/0100714 | A1 | 4/2010 | Noyes et al. |
| 2010/0115347 | A1 | 5/2010 | Noyes |
| 2010/0122024 | A1 | 5/2010 | Noyes et al. |
| 2010/0138635 | A1 | 6/2010 | Noyes |
| 2011/0307433 | A1 | 12/2011 | Dlugosch |
| 2011/0307503 | A1 | 12/2011 | Dlugosch |
| 2012/0192163 | A1 | 7/2012 | Glendenning |
| 2012/0192164 | A1 | 7/2012 | Xu |
| 2012/0192165 | A1 | 7/2012 | Xu |
| 2012/0192166 | A1 | 7/2012 | Xu |

OTHER PUBLICATIONS

Bird, S. et al.; One-Level Phonology: Autosegmental Representations and Rules as Finite Automata; Association for Computational Linguistics; University of Edinburgh; vol. 20; No. 1; pp. 55-90; 1994.

Bispo, J. et al.; Regular Expression Matching for Reconfigurable Packet Inspection; IEEE.

Bispo, J. et al.; Synthesis of Regular Expressions Targeting FPGAs: Current Status and Open Issues; IST/INESC-ID, Libson, Portugal; pp. 1-12.

Brodie, B. et al.; A scalable Architecture for High-Throughput Regular-Expression Pattern Matching; Exegy Inc.; pp. 1-12.

Clark, C.; Design of Efficient FPGA Circuits for Matching Complex Patterns in Network Intrusion Detection Systems (Master of Science Thesis); Georgia Institute of Technology; pp. 1-56; Dec. 2003.

Clark, C.; A Unified Model of Pattern-Matching Circuits for Field-Programmable Gate Arrays [Doctoral Dissertation]; Georgia Institute of Technology; pp. 1-177; 2006.

Clark, C. et al.; Scalable Pattern Matching for High Speed Networks; Proceedings of the 12$^{th}$ Annual IEEE symposium on Field-Programmable Custom Computing Machines (FCCM'04);Georgia Institute of Technology; pp. 1-9; 2004.

Clark, C. et al.; A Unified Model of Pattern-Matching Circuit Architectures; Tech Report GIT-CERCS-05-20;Georgia Institute of Technology; pp. 1-17.

Fide, S.; String Processing in Hardware; Scalable Parallel and Distributed Systems Lab; Proceedings of the 12$^{th}$ Annual IEEE symposium on Field-Programmable Custom Computing Machines (FCCM'04);School of Electrical and Computer Engineering; Georgia Institute of Technology; pp. 1-9; 2004.

Fisk, M. et al.; Applying Fast String Matching to Intrusion Detection; Los Alamos National Laboratory; University of California San Diego; pp. 1-21.

Korenek, J.; Traffic Scanner-Hardware Accelerated Intrusion Detection System; http://www.liberouter.org/ ;2006.

Kumar, S. et al.; Curing Regular Expressions matching Algorithms from Insomnia, Amnesia, and Acaluia; Department of Computer Science and Engineering; Washington University in St. Louis; pp. 1-17; Apr. 27, 2007.

Lipovski, G.; Dynamic Systolic Associative Memory Chip; IEEE; Department of Electrical and Computer Engineering; University of Texas at Austin; pp. 481-492; 1990.

Lin, C. et al.; Optimization of Pattern Matching Circuits for Regular Expression on FPGA; IEEE Transactions on Very Large Scale Integrations Systems; vol. 15, No. 12, pp. 1-6; Dec. 2007.

Schultz, K. et al.; Fully Parallel Integrated CAM/RAM Using Preclassification to Enable Large Capacities; IEEE Journal on Solid-State Circuits; vol. 31; No. 5; pp. 689-699; May 1996.

Shafai, F. et al.; Fully Parallel 30-MHz, 2.5-Mb CAM; IEEE Journal of Solid-State Circuits, vol. 33; No. 11; pp. 1690-1696; Nov. 1998.

Sidhu, R. et al.; Fast Regular Expression Pattern Matching using FPGAs; Department of EE-Systems; University of Southern California; pp. 1-12.

Wada, T.; Multiobject Behavior Recognition Event Driven Selective Attention Method; IEEE; pp. 1-16; 2000.

Yu, F.; High Speed Deep Packet Inspection with Hardware Support; Electrical Engineering and Computer Sciences; University of California at Berkeley; pp. 1-217; Nov. 22, 2006.

Freescale and Kaspersky® Accelerated Antivirus Solution Platform for OEM Vendors; Freescale Semiconductors Document; pp. 1-16; 2007.

Hurson A. R.; A VLSI Design for the Parallel Finite State Automaton and Its Performance Evaluation as a Hardware Scanner; International Journal of Computer and Information Sciences, vol. 13, No. 6. 1984.

* cited by examiner

| CHIP SELECT | A3 | A2 | A1 | A0 | VALID BYTES |
|---|---|---|---|---|---|
| 0 | X | X | X | X | NONE |
| 1 | 0 | 0 | 0 | 0 | NONE |
| 1 | 0 | 0 | 0 | 1 | BYTE 0 |
| 1 | 0 | 0 | 1 | 0 | BYTE 1 |
| 1 | 0 | 0 | 1 | 1 | BYTE 0 AND 1 |
| 1 | 0 | 1 | 0 | 0 | BYTE 2 |
| 1 | 0 | 1 | 0 | 1 | BYTES 0 AND 2 |
| 1 | 0 | 1 | 1 | 0 | BYTES 1 AND 2 |
| 1 | 0 | 1 | 1 | 1 | BYTES 0, 1, AND 2 |
| 1 | 1 | 0 | 0 | 0 | BYTE 3 |
| 1 | 1 | 0 | 0 | 1 | BYTES 0 AND 3 |
| 1 | 1 | 0 | 1 | 0 | BYTES 0, 1, AND 3 |
| 1 | 1 | 0 | 1 | 1 | BYTES 2 AND 3 |
| 1 | 1 | 1 | 0 | 0 | BYTES 0, 2, AND 3 |
| 1 | 1 | 1 | 0 | 1 | BYTES 1, 2, AND 3 |
| 1 | 1 | 1 | 1 | 0 | BYTES 0, 1, 2, AND 3 |
| 1 | 1 | 1 | 1 | 1 | BYTES 0, 1, 2 AND 3 |

FIG. 17

METHODS AND SYSTEMS TO ACCOMPLISH VARIABLE WIDTH DATA INPUT

CROSS-REFERENCE TO RELATED APPLICATION

This application is a continuation of U.S. patent application Ser. No. 13/169,979, which was filed on Jun. 27, 2011, now U.S. Pat. No. 8,260,987, which issued on Sep. 4, 2012, which is a continuation of U.S. patent application Ser. No. 12/265,421, which was filed on Nov. 5, 2008, now U.S. Pat. No. 7,970,964, which issued on Jun. 28, 2011.

BACKGROUND

1. Field of Invention

Embodiments of the invention relate generally to digital data processing, and, more specifically, in certain embodiments, to providing variable-width data input to a fixed-width device.

2. Description of Related Art

In the field of computing, pattern-recognition tasks are increasingly challenging. Ever larger volumes of data are transmitted between computers, and the number of patterns that users wish to identify is increasing. For example, spam and/or malware are often detected by searching for patterns in a data stream, e.g., particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, pattern-recognition may slow the receipt of data.

The data stream that includes the pattern of interest may be provided to a "fixed-width" device for processing. That is, the device receives and processes units of data having a specific size, such as one byte. In this instance, the device may be referred to as a "byte-oriented" device that receives one byte, i.e., 8 bits, at a time. In some systems, the device may be coupled to a bus wider than 8 bits, such as a 16-bit bus, 32-bit bus, etc. Existing mechanisms allow individual bytes to be accessed in these 16-bit, 32-bit, or wider buses. However, accessing individual bytes, such as may be provided by the one byte data stream to the device, does not use the full capacity of the 16-bit, 32-bit, or other wider buses, thus slowing down performance. The "byte-oriented" device is only capable of receiving one byte at a time, regardless of the width of the bus. For example, data having four bytes would require four byte-wide cycles, one byte per each cycle, to transmit the bytes. Additionally, some devices may process large quantities of bytes and may also process each byte in a sequence. These characteristics may cause bus congestion and a slow-down of the device.

BRIEF DESCRIPTION OF DRAWINGS

FIG. 17 is a table illustrating a schema for "Byte-Valid" signals in accordance with another embodiment of the present invention;

FIG. 18 is a logic diagram illustrating a buffer used with the variable width data system of FIG. 13 in accordance with an embodiment of the present invention.

DETAILED DESCRIPTION

Figure 1:
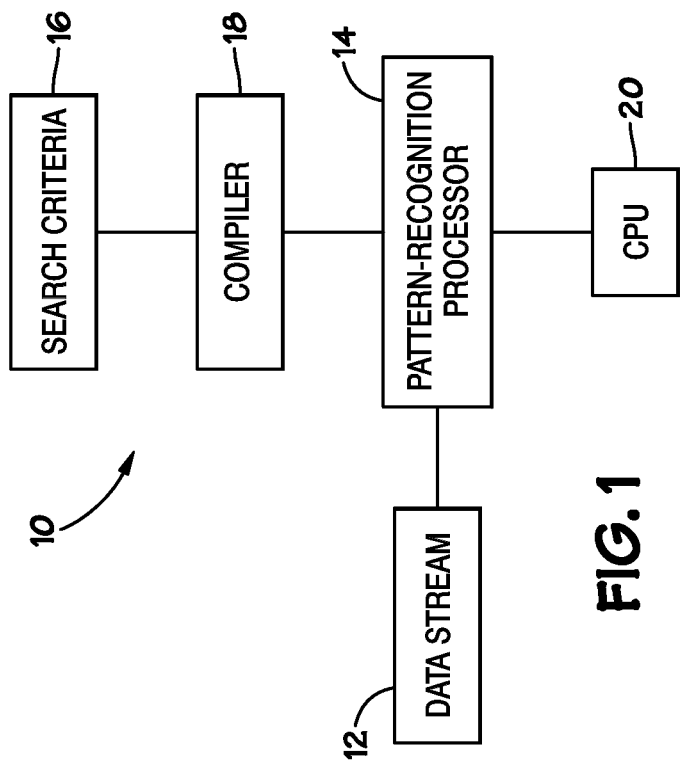
FIG. 1 depicts an example of system that searches a data stream.

FIG. 1 depicts an example of a system 10 that searches a data stream 12. The system 10 may include a pattern-recognition processor 14 that searches the data stream 12 according to search criteria 16.

Each search criterion may specify one or more target expressions, i.e., patterns. The phrase "target expression" refers to a sequence of data for which the pattern-recognition processor 14 is searching. Examples of target expressions include a sequence of characters that spell a certain word, a sequence of genetic base pairs that specify a gene, a sequence of bits in a picture or video file that form a portion of an image, a sequence of bits in an executable file that form a part of a program, or a sequence of bits in an audio file that form a part of a song or a spoken phrase.

A search criterion may specify more than one target expression. For example, a search criterion may specify all five-letter words beginning with the sequence of letters "cl", any word beginning with the sequence of letters "cl", a paragraph that includes the word "cloud" more than three times, etc. The number of possible sets of target expressions is arbitrarily large, e.g., there may be as many target expressions as there are permutations of data that the data stream could present. The search criteria may be expressed in a variety of formats, including as regular expressions, a programming language that concisely specifies sets of target expressions without necessarily listing each target expression.

Each search criterion may be constructed from one or more search terms. Thus, each target expression of a search criterion may include one or more search terms and some target expressions may use common search terms. As used herein, the phrase "search term" refers to a sequence of data that is searched for, during a single search cycle. The sequence of data may include multiple bits of data in a binary format or other formats, e.g., base ten, ASCII, etc. The sequence may encode the data with a single digit or multiple digits, e.g., several binary digits. For example, the pattern-recognition processor 14 may search a text data stream 12 one character at a time, and the search terms may specify a set of single characters, e.g., the letter "a", either the letters "a" or "e", or a wildcard search term that specifies a set of all single characters.

Search terms may be smaller or larger than the number of bits that specify a character (or other grapheme—i.e., fundamental unit—of the information expressed by the data stream, e.g., a musical note, a genetic base pair, a base-10 digit, or a sub-pixel). For instance, a search term may be 8 bits and a single character may be 16 bits, in which case two consecutive search terms may specify a single character.

The search criteria 16 may be formatted for the pattern-recognition processor 14 by a compiler 18. Formatting may include deconstructing search terms from the search criteria. For example, if the graphemes expressed by the data stream 12 are larger than the search terms, the compiler may deconstruct the search criterion into multiple search terms to search for a single grapheme. Similarly, if the graphemes expressed by the data stream 12 are smaller than the search terms, the compiler 18 may provide a single search term, with unused bits, for each separate grapheme. The compiler 18 may also format the search criteria 16 to support various regular expressions operators that are not natively supported by the pattern-recognition processor 14.

The pattern-recognition processor 14 may search the data stream 12 by evaluating each new term from the data stream 12. The word "term" here refers to the amount of data that could match a search term. During a search cycle, the pattern-recognition processor 14 may determine whether the currently presented term matches the current search term in the search criterion. If the term matches the search term, the evaluation is "advanced", i.e., the next term is compared to the next search term in the search criterion. If the term does not match, the next term is compared to the first term in the search criterion, thereby resetting the search.

Each search criterion may be compiled into a different finite state machine in the pattern-recognition processor 14. The finite state machines may run in parallel, searching the data stream 12 according to the search criteria 16. The finite state machines may iterate through each successive search term in a search criterion as the preceding search term is matched by the data stream 12, or if the search term is unmatched, the finite state machines may begin searching for the first search term of the search criterion.

The pattern-recognition processor 14 may evaluate each new term according to several search criteria, and their respective search terms, at about the same time, e.g., during a single device cycle. The parallel finite state machines may each receive the term from the data stream 12 at about the same time, and each of the parallel finite state machines may determine whether the term advances the parallel finite state machine to the next search term in its search criterion. The parallel finite state machines may evaluate terms according to a relatively large number of search criteria, e.g., more than 100, more than 1000, or more than 10,000. Because they operate in parallel, they may apply the search criteria to a data stream 12 having a relatively high bandwidth, e.g., a data stream 12 of greater than or generally equal to 64 MB per second or 128 MB per second. In some embodiments, the search-cycle duration does not scale with the number of search criteria, so the number of search criteria may have little to no effect on the performance of the pattern-recognition processor 14.

When a search criterion is satisfied (i.e., after advancing to the last search term and matching it), the pattern-recognition processor 14 may report the satisfaction of the criterion to a processing unit, such as a central processing unit (CPU) 20. The central processing unit 20 may control the pattern-recognition processor 14 and other portions of the system 10.

The system 10 may be any of a variety of systems or devices that search a stream of data. For example, the system 10 may be a desktop, laptop, handheld or other type of computer that monitors the data stream 12. The system 10 may also be a network node, such as a router, a server, or a client (e.g., one of the previously-described types of computers). The system 10 may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

The data stream 12 may be one or more of a variety of types of data streams that a user or other entity might wish to search. For example, the data stream 12 may be a stream of data received over a network, such as packets received over the Internet or voice or data received over a cellular network. The data stream 12 may be data received from a sensor in communication with the system 10, such as an imaging sensor, a temperature sensor, an accelerometer, or the like, or combinations thereof. The data stream 12 may be received by the system 10 as a serial data stream in which the data is received in an order that has meaning, such as in a temporally, lexically, or semantically significant order. Alternatively, the data stream 12 may be received in parallel or out of order and, then, converted into a serial data stream, e.g., by reordering packets received over the Internet. In some embodiments, the data stream 12 may present terms serially, but the bits expressing each of the terms may be received in parallel. The data stream 12 may be received from a source external to the system 10, or may be formed by interrogating a memory device and forming the data stream 12 from stored data.

Depending on the type of data in the data stream 12, different types of search criteria may be chosen by a designer. For instance, the search criteria 16 may be a virus definition file. Viruses or other malware may be characterized, and aspects of the malware may be used to form search criteria that indicate whether the data stream 12 is likely delivering malware. The resulting search criteria may be stored on a server, and an operator of a client system may subscribe to a service that downloads the search criteria to the system 10. The search criteria 16 may be periodically updated from the server as different types of malware emerge. The search criteria may also be used to specify undesirable content that might be received over a network, for instance unwanted emails (commonly known as spam) or other content that a user finds objectionable.

The data stream 12 may be searched by a third party with an interest in the data being received by the system 10. For example, the data stream 12 may be monitored for text, a sequence of audio, or a sequence of video that occurs in a copyrighted work. The data stream 12 may be monitored for utterances that are relevant to a criminal investigation or civil proceeding or are of interest to an employer.

The search criteria 16 may also include patterns in the data stream 12 for which a translation is available, e.g., in memory addressable by the CPU 20 or the pattern-recognition processor 14. For instance, the search criteria 16 may each specify an English word for which a corresponding Spanish word is stored in memory. In another example, the search criteria 16 may specify encoded versions of the data stream 12, e.g., MP3, MPEG 4, FLAC, Ogg Vorbis, etc., for which a decoded version of the data stream 12 is available, or vice versa.

The pattern-recognition processor 14 may be a hardware device that is integrated with the CPU 20 into a single component (such as a single device) or may be formed as a separate component. For instance, the pattern-recognition processor 14 may be a separate integrated circuit. The pattern-recognition processor 14 may be referred to as a "co-processor" or a "pattern-recognition co-processor".

Figure 2:
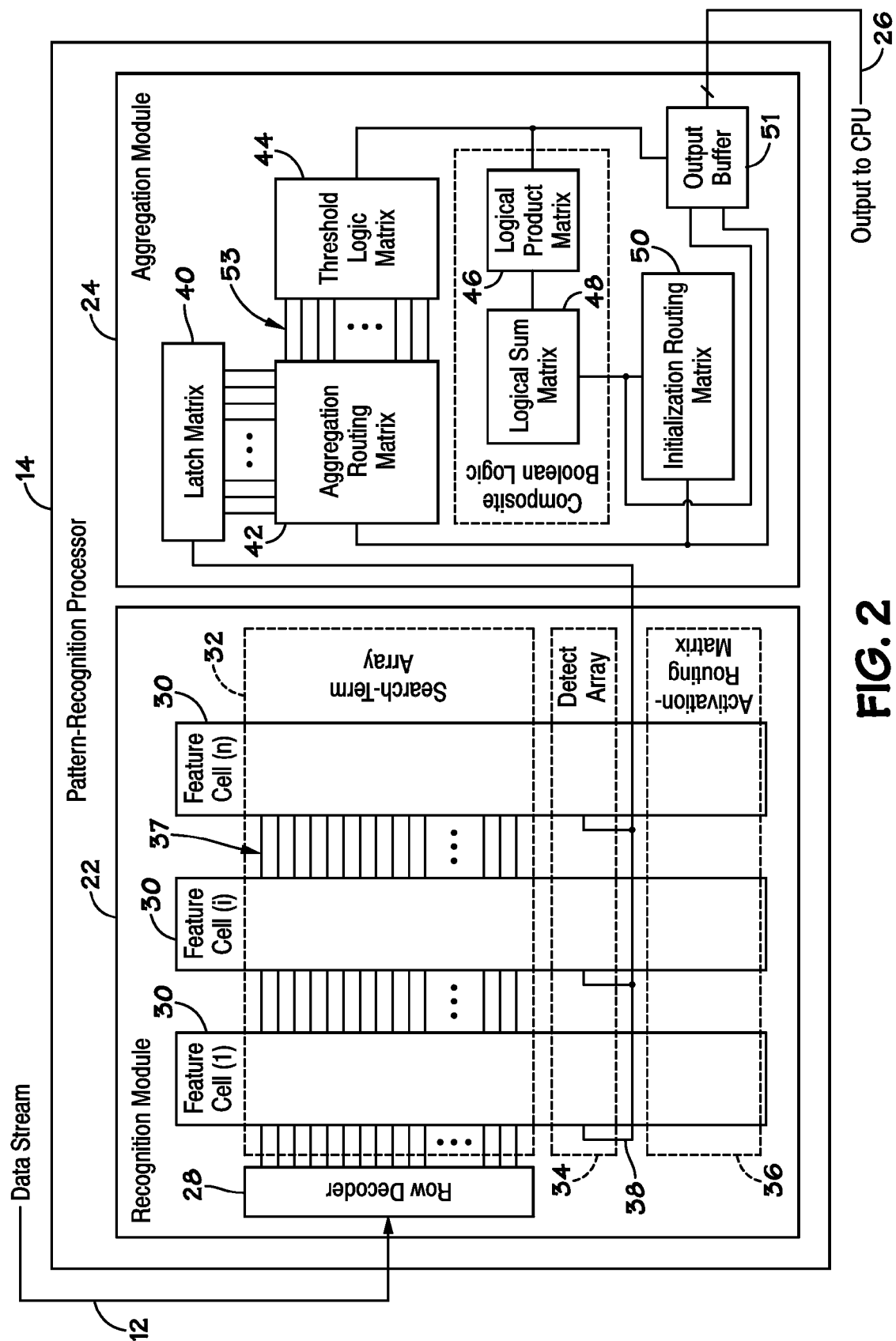
FIG. 2 depicts an example of a pattern-recognition processor in the system of FIG. 1.

FIG. 2 depicts an example of the pattern-recognition processor 14. The pattern-recognition processor 14 may include a recognition module 22 and an aggregation module 24. The recognition module 22 may be configured to compare received terms to search terms, and both the recognition module 22 and the aggregation module 24 may cooperate to determine whether matching a term with a search term satisfies a search criterion.

The recognition module 22 may include a row decoder 28 and a plurality of feature cells 30. Each feature cell 30 may specify a search term, and groups of feature cells 30 may form a parallel finite state machine that forms a search criterion. Components of the feature cells 30 may form a search-term array 32, a detection array 34, and an activation-routing matrix 36. The search-term array 32 may include a plurality of input conductors 37, each of which may place each of the feature cells 30 in communication with the row decoder 28.

The row decoder 28 may select particular conductors among the plurality of input conductors 37 based on the content of the data stream 12. For example, the row decoder 28 may be a one byte to 256 row decoder that activates one of 256 rows based on the value of a received byte, which may represent one term. A one-byte term of 0000 0000 may correspond to the top row among the plurality of input conductors 37, and a one-byte term of 1111 1111 may correspond to the bottom row among the plurality of input conductors 37. Thus, different input conductors 37 may be selected, depending on which terms are received from the data stream 12. As different terms are received, the row decoder 28 may deactivate the row corresponding to the previous term and activate the row corresponding to the new term.

The detection array 34 may couple to a detection bus 38 that outputs signals indicative of complete or partial satisfaction of search criteria to the aggregation module 24. The activation-routing matrix 36 may selectively activate and deactivate feature cells 30 based on the number of search terms in a search criterion that have been matched.

The aggregation module 24 may include a latch matrix 40, an aggregation-routing matrix 42, a threshold-logic matrix 44, a logical-product matrix 46, a logical-sum matrix 48, and an initialization-routing matrix 50.

The latch matrix 40 may implement portions of certain search criteria. Some search criteria, e.g., some regular expressions, count only the first occurrence of a match or group of matches. The latch matrix 40 may include latches that record whether a match has occurred. The latches may be cleared during initialization, and periodically re-initialized during operation, as search criteria are determined to be satisfied or not further satisfiable—i.e., an earlier search term may need to be matched again before the search criterion could be satisfied.

The aggregation-routing matrix 42 may function similar to the activation-routing matrix 36. The aggregation-routing matrix 42 may receive signals indicative of matches on the detection bus 38 and may route the signals to different group-logic lines 53 connecting to the threshold-logic matrix 44. The aggregation-routing matrix 42 may also route outputs of the initialization-routing matrix 50 to the detection array 34 to reset portions of the detection array 34 when a search criterion is determined to be satisfied or not further satisfiable.

The threshold-logic matrix 44 may include a plurality of counters, e.g., 32-bit counters configured to count up or down. The threshold-logic matrix 44 may be loaded with an initial count, and it may count up or down from the count based on matches signaled by the recognition module. For instance, the threshold-logic matrix 44 may count the number of occurrences of a word in some length of text.

The outputs of the threshold-logic matrix 44 may be inputs to the logical-product matrix 46. The logical-product matrix 46 may selectively generate "product" results (e.g., "AND" function in Boolean logic). The logical-product matrix 46 may be implemented as a square matrix, in which the number of output products is equal the number of input lines from the threshold-logic matrix 44, or the logical-product matrix 46 may have a different number of inputs than outputs. The resulting product values may be output to the logical-sum matrix 48.

The logical-sum matrix 48 may selectively generate sums (e.g., "OR" functions in Boolean logic.) The logical-sum matrix 48 may also be a square matrix, or the logical-sum matrix 48 may have a different number of inputs than outputs. Since the inputs are logical products, the outputs of the logical-sum matrix 48 may be logical-Sums-of-Products (e.g., Boolean logic Sum-of-Product (SOP) form). The output of the logical-sum matrix 48 may be received by the initialization-routing matrix 50.

The initialization-routing matrix 50 may reset portions of the detection array 34 and the aggregation module 24 via the aggregation-routing matrix 42. The initialization-routing matrix 50 may also be implemented as a square matrix, or the initialization-routing matrix 50 may have a different number of inputs than outputs. The initialization-routing matrix 50 may respond to signals from the logical-sum matrix 48 and re-initialize other portions of the pattern-recognition processor 14, such as when a search criterion is satisfied or determined to be not further satisfiable.

The aggregation module 24 may include an output buffer 51 that receives the outputs of the threshold-logic matrix 44, the aggregation-routing matrix 42, and the logical-sum matrix 48. The output of the aggregation module 24 may be transmitted from the output buffer 51 to the CPU 20 (FIG. 1) on the output bus 26. In some embodiments, an output multiplexer may multiplex signals from these components 42, 44, and 48 and output signals indicative of satisfaction of criteria or matches of search terms to the CPU 20 (FIG. 1). In other embodiments, results from the pattern-recognition processor 14 may be reported without transmitting the signals through the output multiplexer, which is not to suggest that any other feature described herein could not also be omitted. For example, signals from the threshold-logic matrix 44, the logical-product matrix 46, the logical-sum matrix 48, or the initialization routing matrix 50 may be transmitted to the CPU in parallel on the output bus 26.

Figure 3:
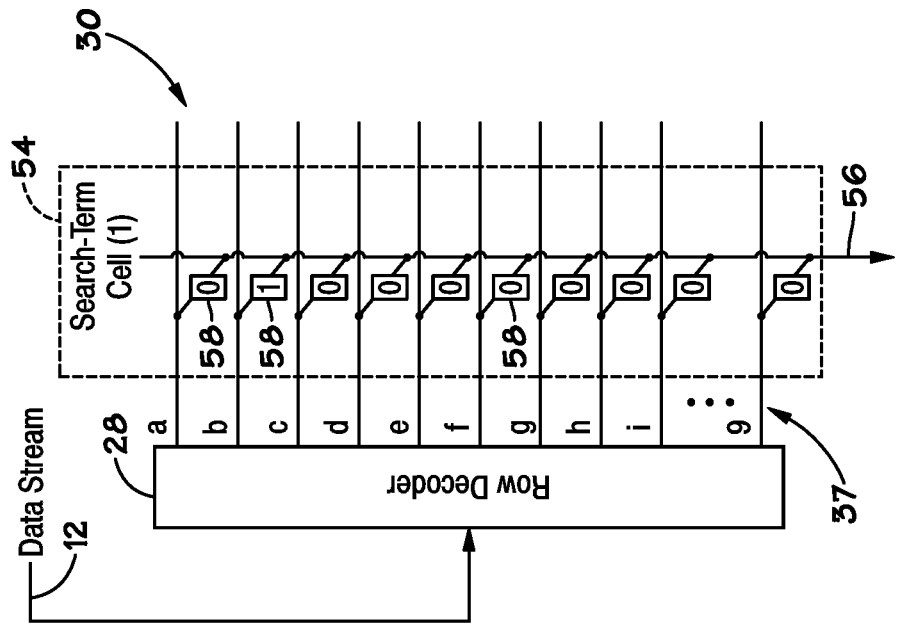
FIG. 3 depicts an example of a search-term cell in the pattern-recognition processor of FIG. 2.

FIG. 3 illustrates a portion of a single feature cell 30 in the search-term array 32 (FIG. 2), a component referred to herein as a search-term cell 54. The search-term cells 54 may include an output conductor 56 and a plurality of memory cells 58. Each of the memory cells 58 may be coupled to both the output conductor 56 and one of the conductors among the plurality of input conductors 37. In response to its input conductor 37 being selected, each of the memory cells 58 may output a value indicative of its stored value, outputting the data through the output conductor 56. In some embodiments, the plurality of input conductors 37 may be referred to as "word lines", and the output conductor 56 may be referred to as a "data line".

The memory cells 58 may include any of a variety of types of memory cells. For example, the memory cells 58 may be volatile memory, such as dynamic random access memory (DRAM) cells having a transistor and a capacitor. The source and the drain of the transistor may be connected to a plate of the capacitor and the output conductor 56, respectively, and the gate of the transistor may be connected to one of the input conductors 37. In another example of volatile memory, each of the memory cells 58 may include a static random access memory (SRAM) cell. The SRAM cell may have an output that is selectively coupled to the output conductor 56 by an access transistor controlled by one of the input conductors 37. The memory cells 58 may also include nonvolatile memory, such as phase-change memory (e.g., an ovonic device), flash memory, silicon-oxide-nitride-oxide-silicon (SONOS) memory, magneto-resistive memory, or other types of nonvolatile memory. The memory cells 58 may also include flip-flops, e.g., memory cells made out of logic gates.

Figure 5:
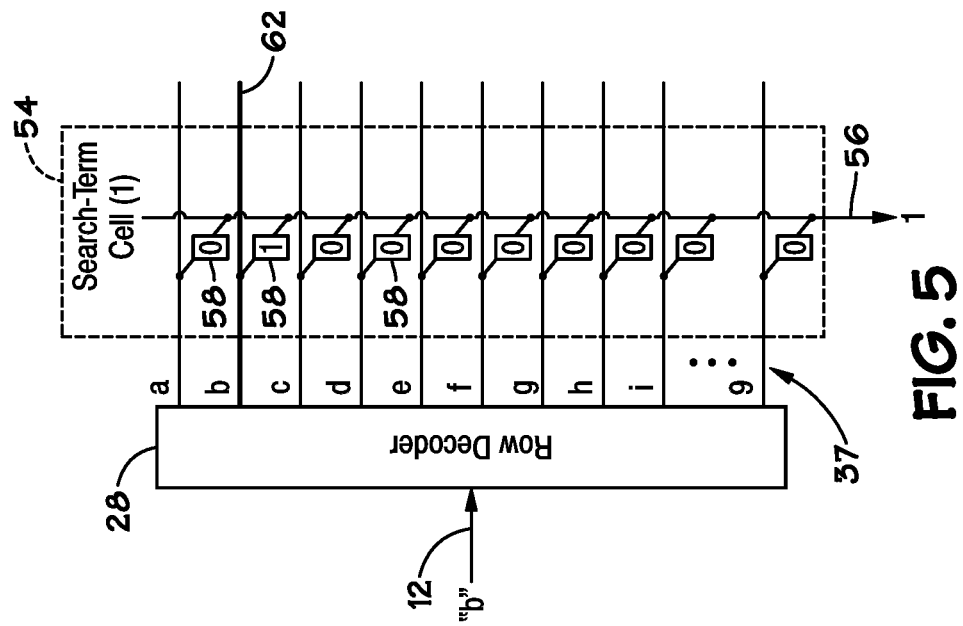
FIGS. 4 and 5 depict the search-term cell of FIG. 3 searching the data stream for a single character.
Figure 4:
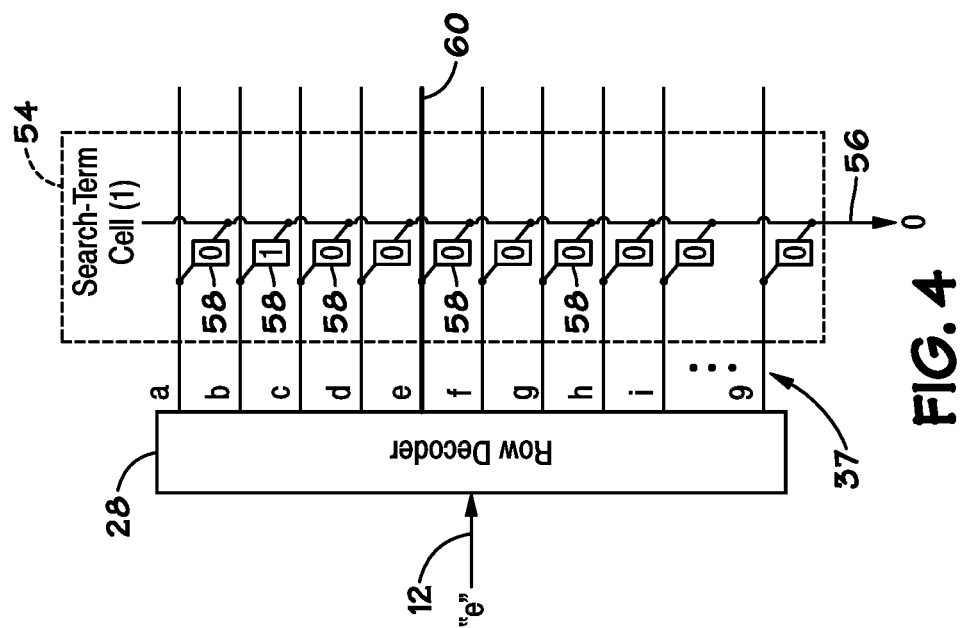

FIGS. 4 and 5 depict an example of the search-term cell 54 in operation. FIG. 4 illustrates the search-term cell 54 receiving a term that does not match the cell's search term, and FIG. 5 illustrates a match.

As illustrated by FIG. 4, the search-term cell 54 may be configured to search for one or more terms by storing data in the memory cells 58. The memory cells 58 may each represent a term that the data stream 12 might present, e.g., in FIG. 3, each memory cell 58 represents a single letter or number, starting with the letter "a" and ending with the number "9". Memory cells 58 representing terms that satisfy the search term may be programmed to store a first value, and memory cells 58 that do not represent terms that satisfy the search term may be programmed to store a different value. In the illustrated example, the search-term cell 54 is configured to search for the letter "b". The memory cells 58 that represent "b" may store a 1, or logic high, and the memory cells 58 that do not represent "b" may be programmed to store a 0, or logic low.

To compare a term from the data stream 12 with the search term, the row decoder 28 may select the input conductor 37 coupled to memory cells 58 representing the received term. In FIG. 4, the data stream 12 presents a lowercase "e". This term may be presented by the data stream 12 in the form of an eight-bit ASCII code, and the row decoder 28 may interpret this byte as a row address, outputting a signal on the conductor 60 by energizing it.

In response, the memory cell 58 controlled by the conductor 60 may output a signal indicative of the data that the memory cell 58 stores, and the signal may be conveyed by the output conductor 56. In this case, because the letter "e" is not one of the terms specified by the search-term cell 54, it does not match the search term, and the search-term cell 54 outputs a 0 value, indicating no match was found.

In FIG. 5, the data stream 12 presents a character "b". Again, the row decoder 28 may interpret this term as an address, and the row decoder 28 may select the conductor 62. In response, the memory cell 58 representing the letter "b" outputs its stored value, which in this case is a 1, indicating a match.

The search-term cells 54 may be configured to search for more than one term at a time. Multiple memory cells 58 may be programmed to store a 1, specifying a search term that matches with more than one term. For instance, the memory cells 58 representing the letters lowercase "a" and uppercase "A" may be programmed to store a 1, and the search-term cell 54 may search for either term. In another example, the search-term cell 54 may be configured to output a match if any character is received. All of the memory cells 58 may be programmed to store a 1, such that the search-term cell 54 may function as a wildcard term in a search criterion.

Figure 6:
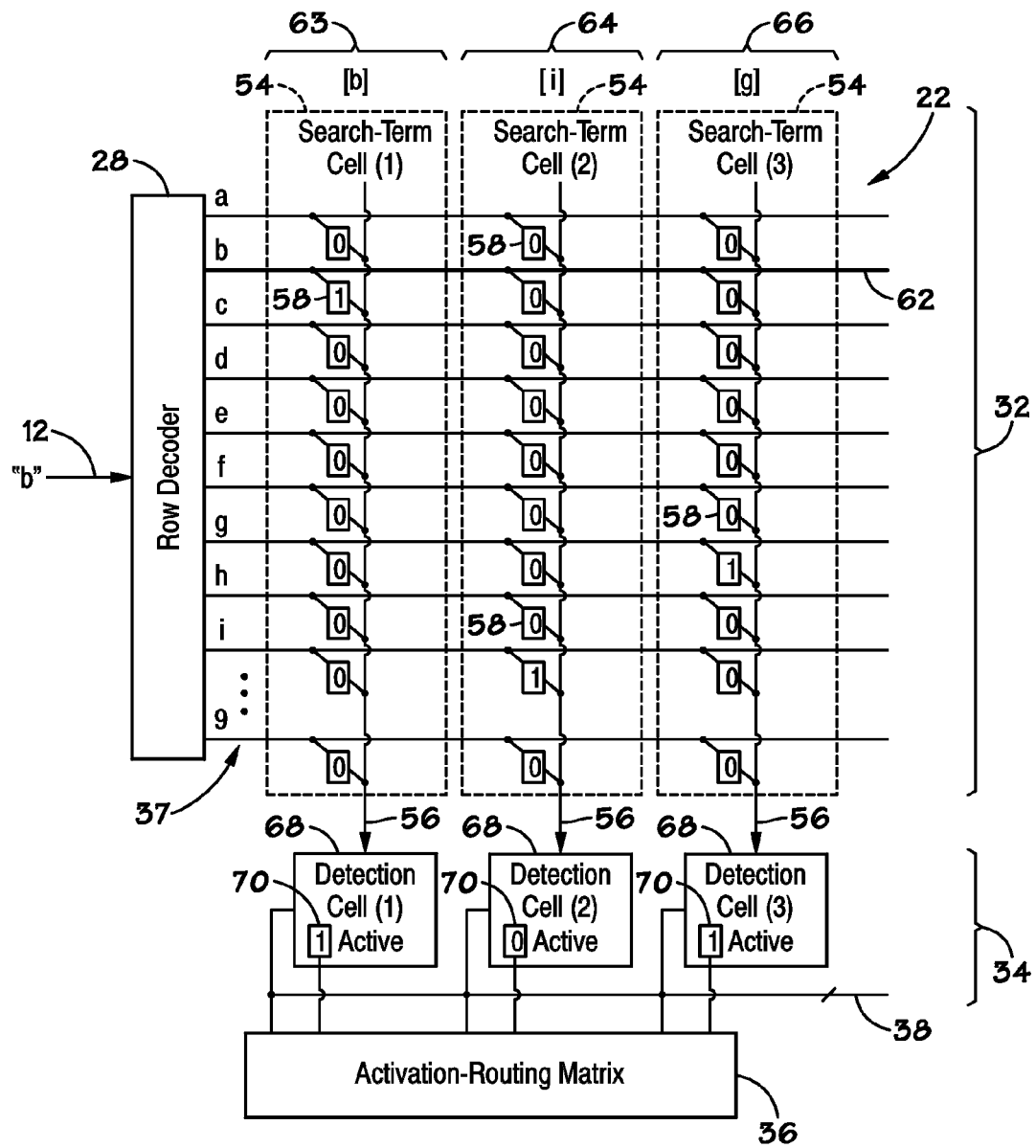
FIGS. 6-8 depict a recognition module including several search-term cells searching the data stream for a word.
Figure 7:
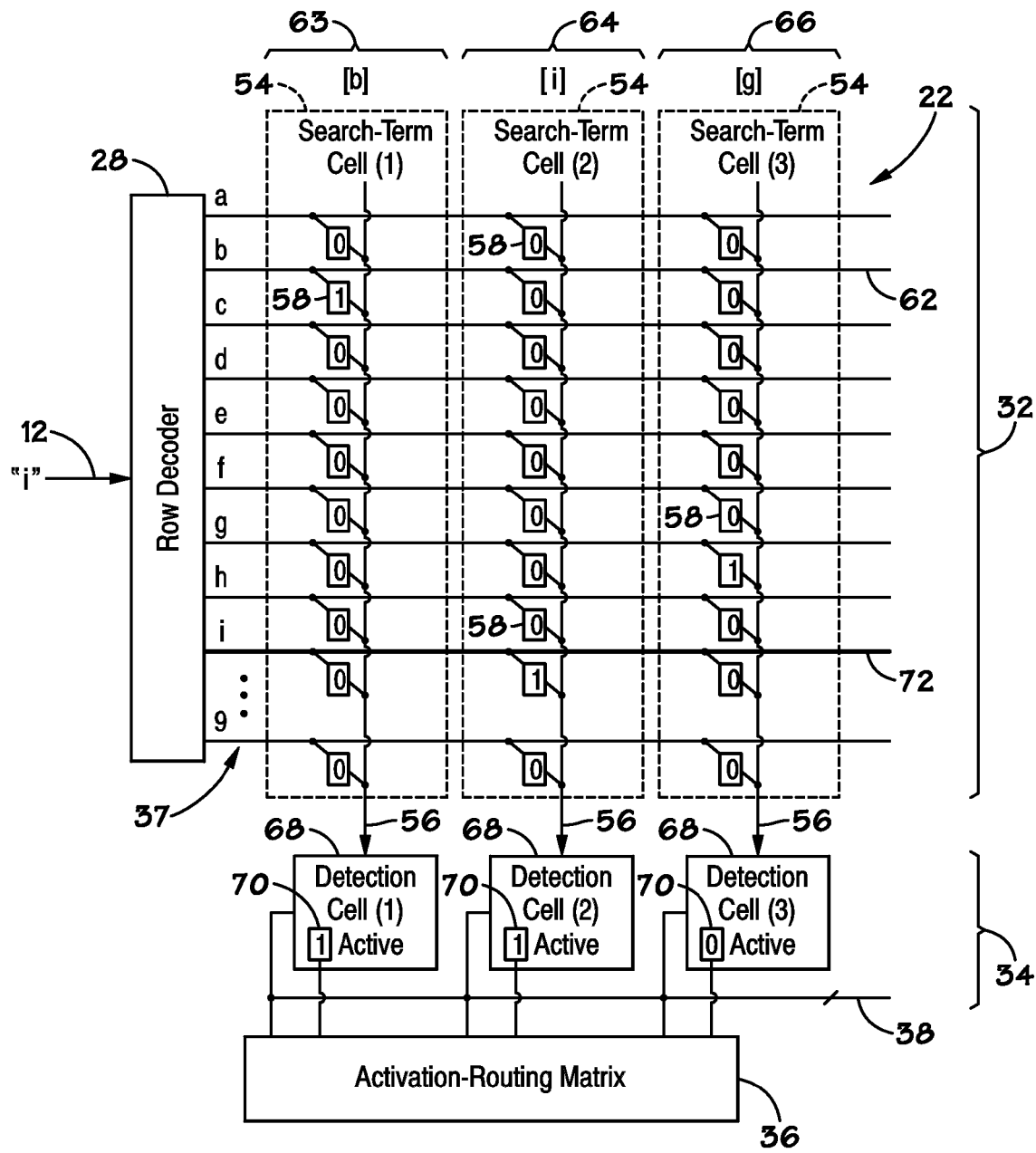
Figure 8:
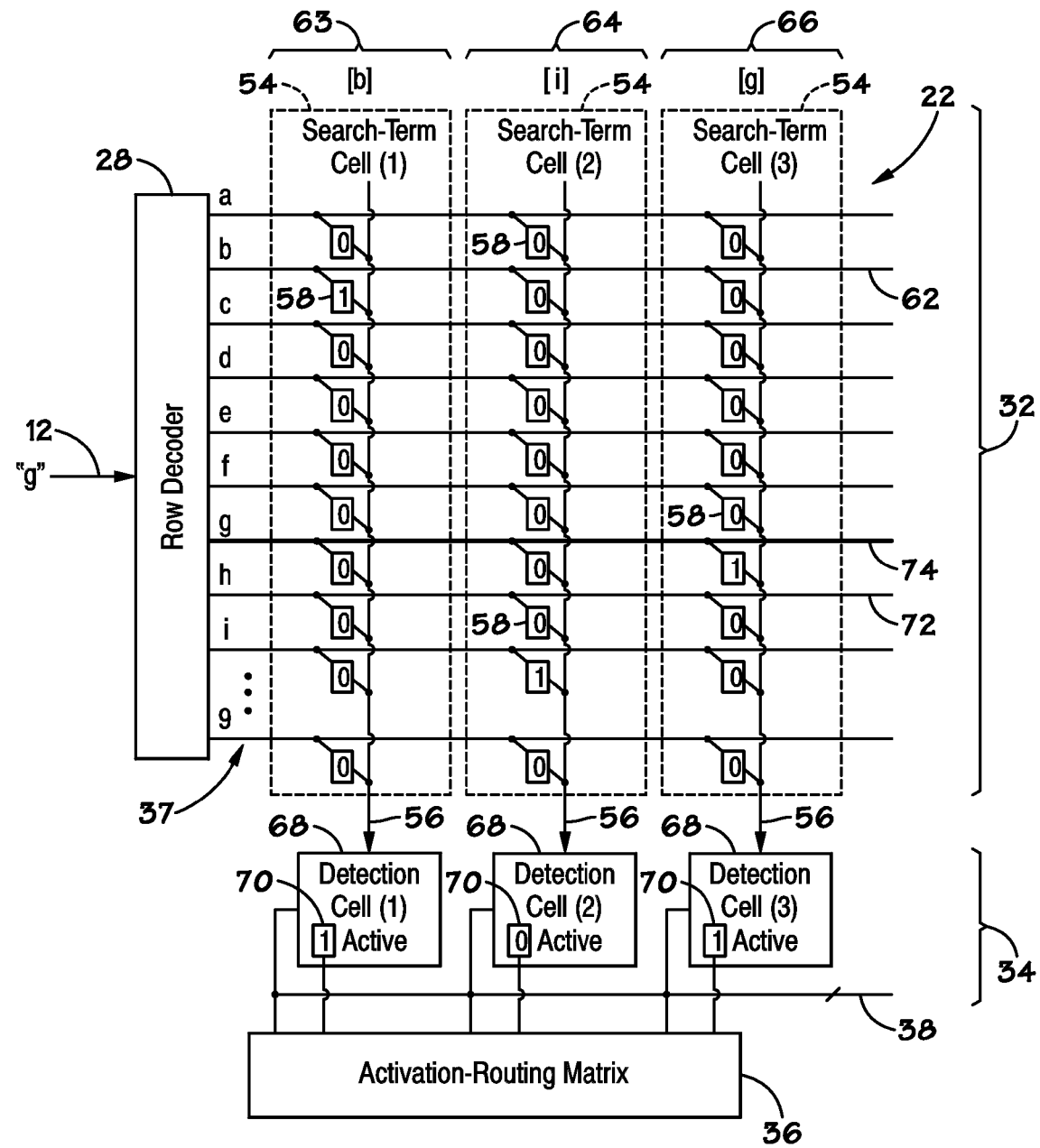

FIGS. 6-8 depict the recognition module 22 searching according to a multi-term search criterion, e.g., for a word. Specifically, FIG. 6 illustrates the recognition module 22 detecting the first letter of a word, FIG. 7 illustrates detection of the second letter, and FIG. 8 illustrates detection of the last letter.

As illustrated by FIG. 6, the recognition module 22 may be configured to search for the word "big". Three adjacent feature cells 63, 64, and 66 are illustrated. The feature cell 63 is configured to detect the letter "b". The feature cell 64 is configured to detect the letter "i". The feature cell 66 is configured to both detect the letter "g" and indicate that the search criterion is satisfied.

FIG. 6 also depicts additional details of the detection array 34. The detection array 34 may include a detection cell 68 in each of the feature cells 63, 64, and 66. Each of the detection cells 68 may include a memory cell 70, such as one of the types of memory cells described above (e.g., a flip-flop), that indicates whether the feature cell 63, 64, or 66 is active or inactive. The detection cells 68 may be configured to output a signal to the activation-routing matrix 36 indicating whether the detection cells 68 are active and has received a signal from its associated search-term cell 54 indicating a match. Inactive features cells 63, 64, and 66 may disregard matches. Each of the detection cells 68 may include an AND gate with inputs from the memory cell 70 and the output conductor 56. The output of the AND gate may be routed to both the detection bus 38 and the activation-routing matrix 36, or one or the other.

The activation-routing matrix 36, in turn, may selectively activate the feature cells 63, 64, and 66 by writing to the memory cells 70 in the detection array 34. The activation-routing matrix 36 may activate feature cells 63, 64, or 66 according to the search criterion and which search term is being searched for next in the data stream 12.

In FIG. 6, the data stream 12 presents the letter "b". In response, each of the feature cells 63, 64, and 66 may output a signal on their output conductor 56, indicating the value stored in the memory cell 58 connected to the conductor 62, which represents the letter "b". The detection cells 56 may then each determine whether they have received a signal indicating a match and whether they are active. Because the feature cell 63 is configured to detect the letter "b" and is active, as indicated by its memory cell 70, the detection cell 68 in the feature cell 63 may output a signal to the activation-routing matrix 36 indicating that the first search term of the search criterion has been matched.

As illustrated by FIG. 7, after the first search term is matched, the activation-routing matrix 36 may activate the next feature cell 64 by writing a 1 to its memory cell 70 in its detection cell 68. The activation-routing matrix 36 may also maintain the active state of the feature cell 63, in case the next term satisfies the first search term, e.g., if the sequence of terms "bbig" is received. The first search term of search criteria may be maintained in an active state during a portion or substantially all of the time during which the data stream 12 is searched.

In FIG. 7, the data stream 12 presents the letter "i" to the recognition module 22. In response, each of the feature cells 63, 64, and 66 may output a signal on their output conductor 56, indicating the value stored in the memory cell 58 connected to the conductor 72, which represents the letter "i". The detection cells 56 may then each determine whether they have received a signal indicating a match and whether they are active. Because the feature cell 64 is configured to detect the letter "i" and is active, as indicated by its memory cell 70, the detection cell 68 in the feature cell 64 may output a signal to the activation-routing matrix 36 indicating that the next search term of its search criterion has been matched.

Next, the activation-routing matrix 36 may activate the feature cell 66, as illustrated by FIG. 8. Before evaluating the next term, the feature cell 64 may be deactivated. The feature cell 64 may be deactivated by its detection cell 68 resetting its memory cell 70 between detection cycles or the activation-routing matrix 36 may deactivate the feature cell 64, for example.

In FIG. 8, the data stream 12 presents the term "g" to the row decoder 28, which selects the conductor 74 representing the term "g". In response, each of the feature cells 63, 64, and 66 may output a signal on their output conductor 56, indicating the value stored in the memory cell 58 connected to the conductor 74, which represents the letter "g". The detection cells 68 may then each determine whether they have received a signal indicating a match and whether they are active. Because the feature cell 66 is configured to detect the letter "g" and is active, as indicated by its memory cell 70, the detection cell 68 in the feature cell 66 may output a signal to the activation routing matrix 36 indicating that the last search term of its search criterion has been matched.

The end of a search criterion or a portion of a search criterion may be identified by the activation-routing matrix 36 or the detection cell 68. These components 36 or 68 may include memory indicating whether their feature cell 63, 64, or 66 specifies the last search term of a search criterion or a component of a search criterion. For example, a search criterion may specify all sentences in which the word "cattle" occurs twice, and the recognition module may output a signal indicating each occurrence of "cattle" within a sentence to the aggregation module, which may count the occurrences to determine whether the search criterion is satisfied.

Feature cells 63, 64, or 66 may be activated under several conditions. A feature cell 63, 64, or 66 may be "always active", meaning that it remains active during all or substantially all of a search. An example of an always active feature cell 63, 64, or 66 is the first feature cell of the search criterion, e.g., feature cell 63.

A feature cell 63, 64, or 66 may be "active when requested", meaning that the feature cell 63, 64, or 66 is active when some condition precedent is matched, e.g., when the preceding search terms in a search criterion are matched. An example is the feature cell 64, which is active when requested by the feature cell 63 in FIGS. 6-8, and the feature cell 66, which is active when requested by the feature cell 64.

A feature cell 63, 64, or 66 may be "self activated", meaning that once it is activated, it activates itself as long as its search term is matched. For example, a self activated feature cell having a search term that is matched by any numerical digit may remain active through the sequence "123456xy" until the letter "x" is reached. Each time the search term of the self activated feature cell is matched, it may activate the next feature cell in the search criterion. Thus, an always active feature cell may be formed from a self activating feature cell and an active when requested feature cell. The self activating feature cell may be programmed with all of its memory cells 58 storing a 1, and it may repeatedly activate the active when requested feature cell after each term. In some embodiments, each feature cell 63, 64, and 66 may include a memory cell in its detection cell 68 or in the activation-routing matrix 36 that specifies whether the feature cell is always active, thereby forming an always active feature cell from a single feature cell.

Figure 9:
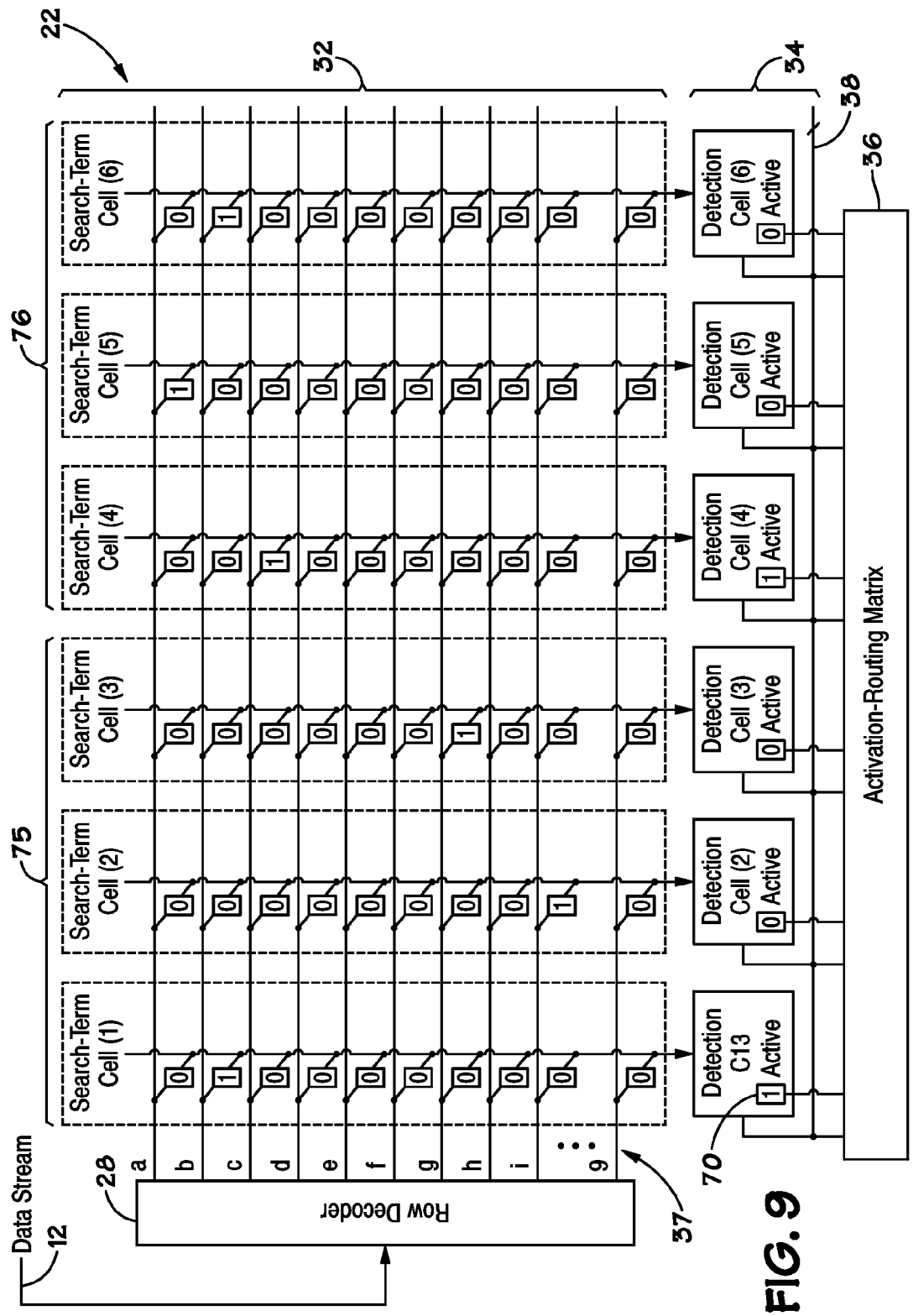
FIG. 9 depicts the recognition module configured to search the data stream for two words in parallel.

FIG. 9 depicts an example of a recognition module 22 configured to search according to a first search criterion 75 and a second search criterion 76 in parallel. In this example, the first search criterion 75 specifies the word "big", and the second search criterion 76 specifies the word "cab". A signal indicative of the current term from the data stream 12 may be communicated to feature cells in each search criterion 75 and 76 at generally the same time. Each of the input conductors 37 spans both of the search criteria 75 and 76. As a result, in some embodiments, both of the search criteria 75 and 76 may evaluate the current term generally simultaneously. This is believed to speed the evaluation of search criteria. Other embodiments may include more feature cells configured to evaluate more search criteria in parallel. For example, some embodiments may include more than 100, 500, 1000, 5000, or 10,000 feature cells operating in parallel. These feature cells may evaluate hundreds or thousands of search criteria generally simultaneously.

Search criteria with different numbers of search terms may be formed by allocating more or fewer feature cells to the search criteria. Simple search criteria may consume fewer resources in the form of feature cells than complex search criteria. This is believed to reduce the cost of the pattern-recognition processor 14 (FIG. 2) relative to processors with a large number of generally identical cores, all configured to evaluate complex search criteria.

Figure 10:
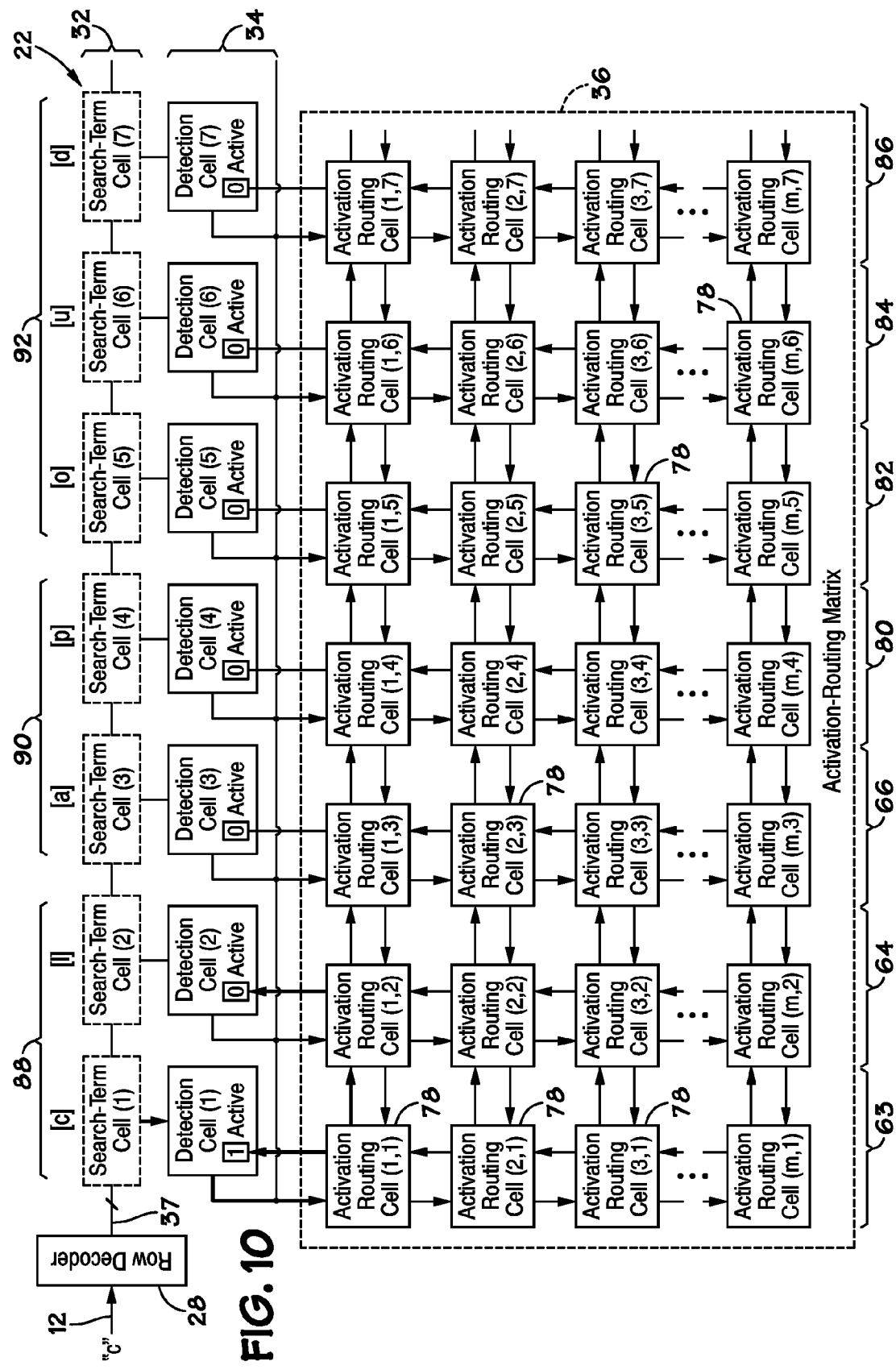
FIGS. 10-12 depict the recognition module searching according to a search criterion that specifies multiple words with the same prefix.
Figure 11:
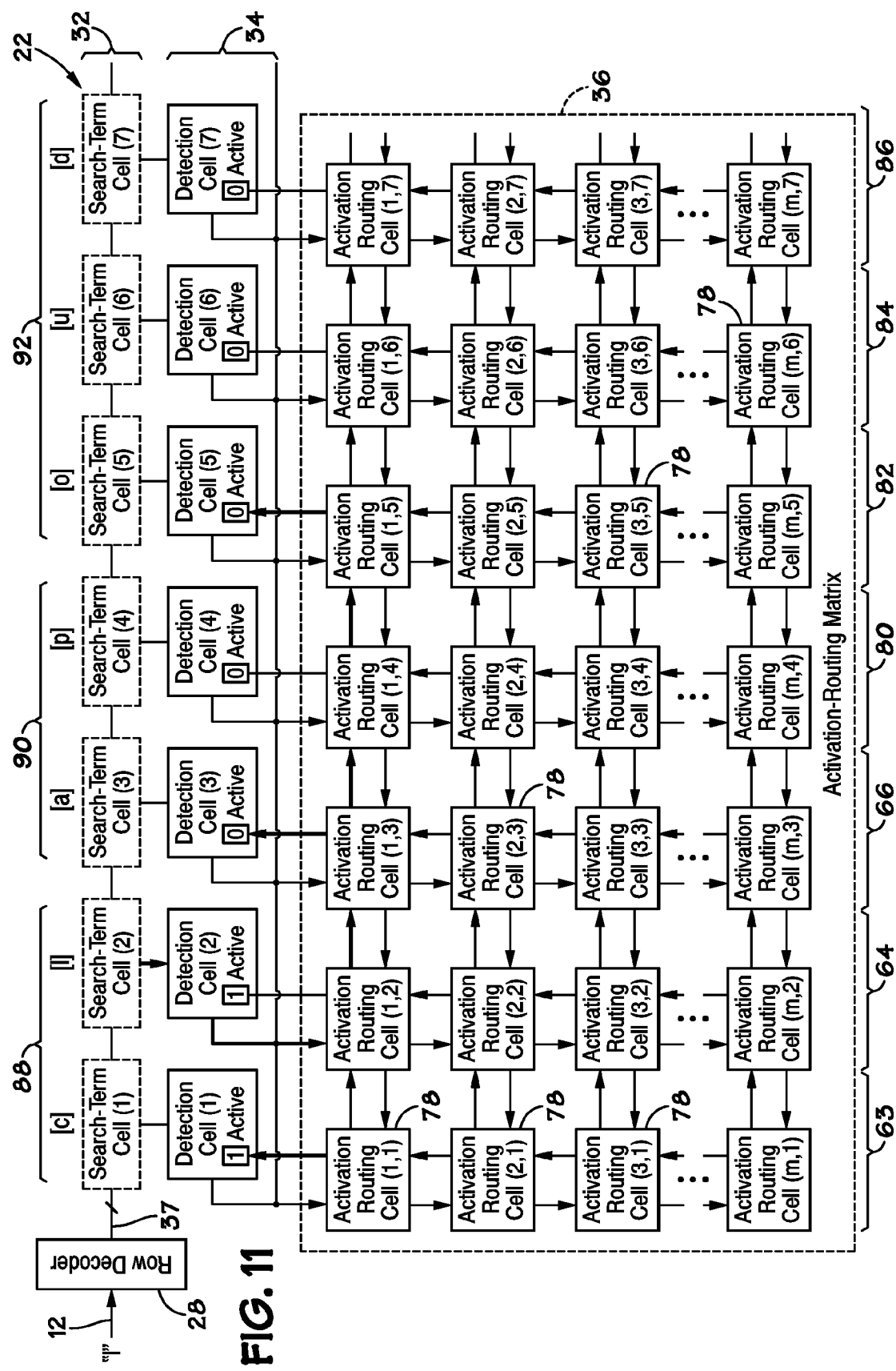
Figure 12:
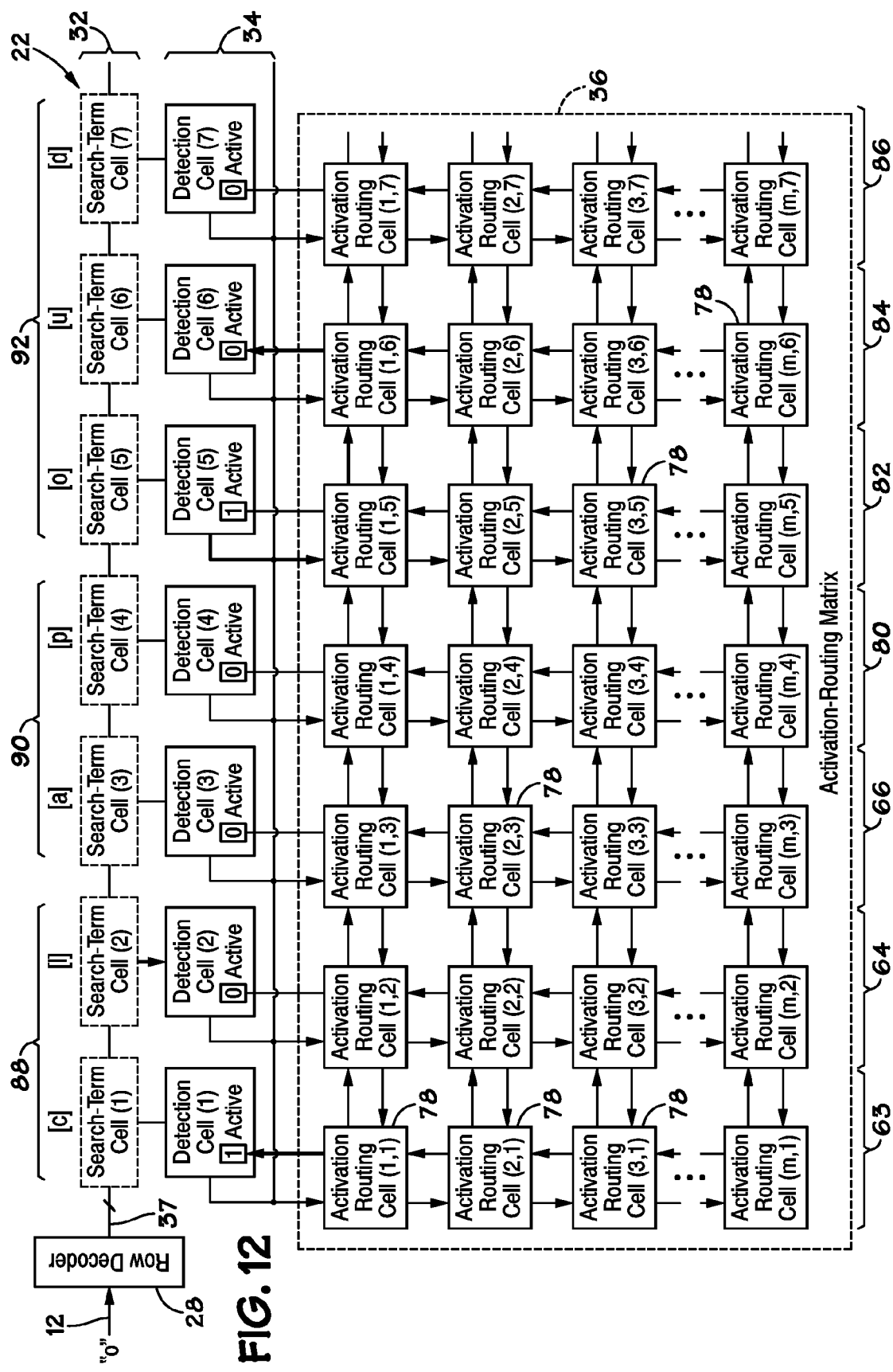

FIGS. 10-12 depict both an example of a more complex search criterion and features of the activation-routing matrix 36. The activation-routing matrix 36 may include a plurality of activation-routing cells 78, groups of which may be associated with each of the feature cells 63, 64, 66, 80, 82, 84, and 86. For instance, each of the feature cells may include 5, 10, 20, 50, or more activation-routing cells 78. The activation-routing cells 78 may be configured to transmit activation signals to the next search term in a search criterion when a preceding search term is matched. The activation-routing cells 78 may be configured to route activation signals to adjacent feature cells or other activation-routing cells 78 within the same feature cell. The activation-routing cells 78 may include memory that indicates which feature cells correspond to the next search term in a search criterion.

As illustrated by FIGS. 10-12, the recognition module 22 may be configured to search according to complex search criteria than criteria that specify single words. For instance, the recognition module 22 may be configured to search for words beginning with a prefix 88 and ending with one of two suffixes 90 or 92. The illustrated search criterion specifies words beginning with the letters "c" and "l" in sequence and ending with either the sequence of letters "ap" or the sequence of letters "oud". This is an example of a search criterion specifying multiple target expressions, e.g., the word "clap" or the word "cloud".

In FIG. 10, the data stream 12 presents the letter "c" to the recognition module 22, and feature cell 63 is both active and detects a match. In response, the activation-routing matrix 36 may activate the next feature cell 64. The activation-routing matrix 36 may also maintain the active state of the feature cell 63, as the feature cell 63 is the first search term in the search criterion.

In FIG. 11, the data stream 12 presents a letter "l", and the feature cell 64 recognizes a match and is active. In response, the activation-routing matrix 36 may transmit an activation signal both to the first feature cell 66 of the first suffix 90 and to the first feature cell 82 of the second suffix 92. In other examples, more suffixes may be activated, or multiple prefixes may active one or more suffixes.

Next, as illustrated by FIG. 12, the data stream 12 presents the letter "o" to the recognition module 22, and the feature cell 82 of the second suffix 92 detects a match and is active. In response, the activation-routing matrix 36 may activate the next feature cell 84 of the second suffix 92. The search for the first suffix 90 may die out, as the feature cell 66 is allowed to go inactive. The steps illustrated by FIGS. 10-12 may continue through the letters "u" and "d", or the search may die out until the next time the prefix 88 is matched.

As described above, the pattern-recognition processor 14 may receive and search the data stream 12 in sequential units of data. For example, a specific number of units (e.g., bits) may represent a term, and consecutive terms may represent larger units, such as characters, words, phrases, etc. In one embodiment, the pattern-recognition processor 14 may receive and search terms that are 8-bits (one byte) wide. In such an embodiment, the incoming data stream 12 may be presented to the processor as a one byte wide data stream with larger units divided into consecutive 8-bit search terms. As described above, the system 10 that includes the pattern-recognition processor 14 may be one of various types of systems, such as network nodes, computers, electronic devices, etc. These systems may provide the data stream 12 over a bus or other communication coupling having a width that is different than the 8-bit wide data stream received and searched by the pattern-recognition processor 14.

Figure 13:
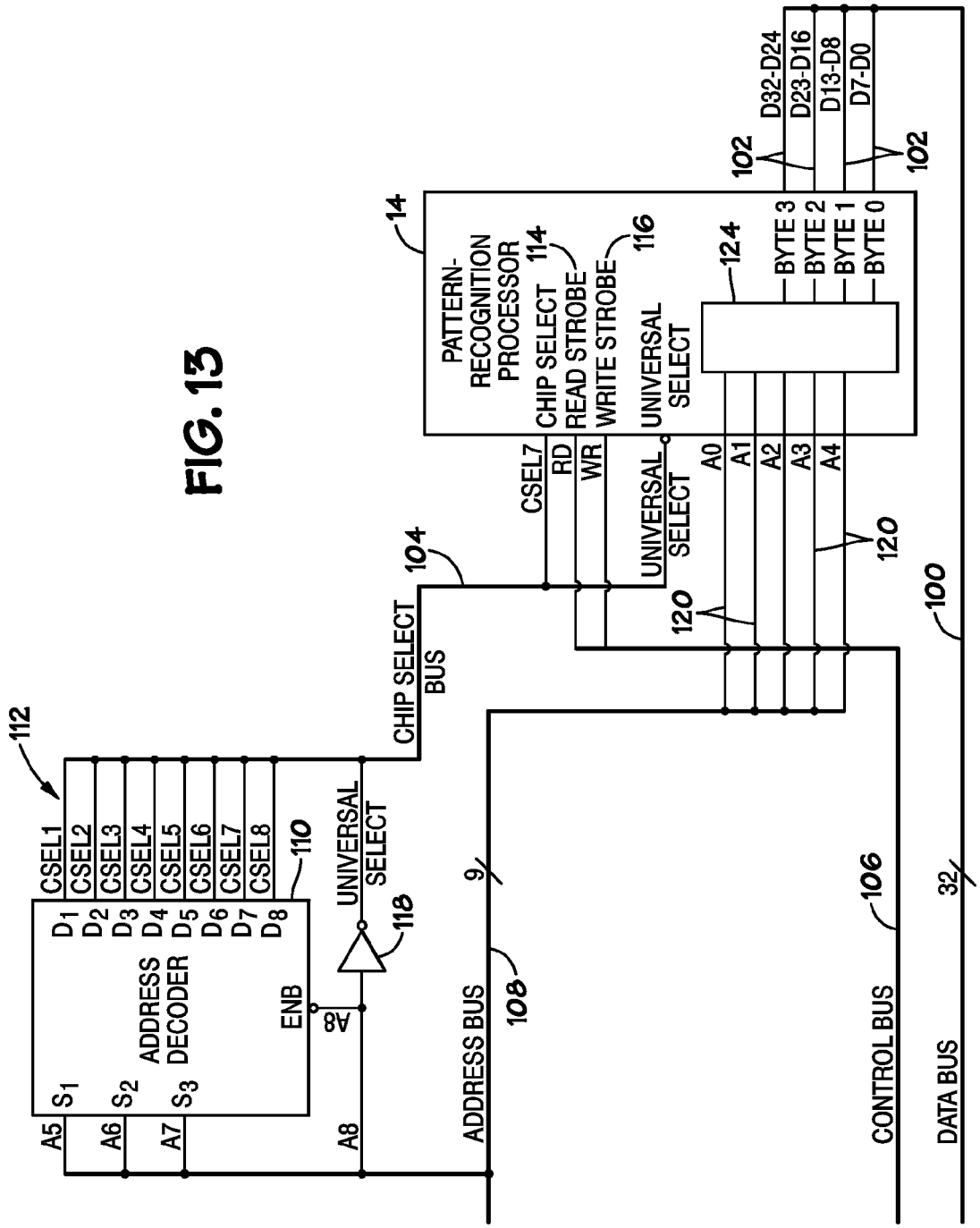
FIG. 13 is a logic diagram depicting a variable width data input system in accordance with an embodiment of the present invention.

FIGS. 13-19 describe a "variable width data input system" that can provide any width data stream to the fixed-width pattern-recognition processor 14 described above. FIG. 13 is logic diagram depicting a variable width data input system in accordance with an embodiment of the present invention. It should be appreciated that the logic diagram illustrates address signals and other signals input to the pattern-recognition processor 14 that may be used in the embodiments described above.

As shown in FIG. 13, the pattern-recognition processor 14 receives the data stream 12 over a data bus 100 that may be coupled to the source of the data stream 12, such as a network, sensor, memory, or any other source of data. In the embodiment illustrated in FIG. 13, the data bus 100 has a width of 32-bits, i.e., a 32-bit bus, capable of carrying four bytes in one bus cycle. In other embodiments, the data bus 100 may be a 16-bit bus, 64-bit bus, 128-bit bus, or any other width bus. The data bus 100 may be any bus used in electronic devices or systems such as computers, routers, firewalls, etc., and may be PCI, PCIe, HyperTransport, PATA, SATA, SCSI, USB, Firewire, CAN or any other bus technology and/or protocol. Additionally, in some embodiments the data bus 100 may connect any component of the system 10, such as I/O cards, memory, microprocessors, etc. to the pattern-recognition processor 14.

In the illustrated embodiment, each of the four bytes transferred over the 32-bit data bus 100 may be referred to as Byte 0, Byte 1, Byte 2, and Byte 3. Additionally, each of the bytes Byte 0, Byte 1, Byte 2, and Byte 3 are illustrated as including eight data bits, labeled as D7-D0, D13-D8, D23-D16, and D31-D24, respectively. The pattern-recognition processor 14 receives the four bytes Byte 0, Byte 1, Byte 2, and Byte 3 from the data bus 100, as illustrated by lines 102. Each byte in the data stream 12 from the 32-bit data bus 100 may not represent a term. That is, if a term in one bus cycle is only represented by one, two, or three bytes, the other bytes in the data stream 12 in that bus cycle are not used. Those bytes representing the term may be referred to as "valid" bytes. Those bytes in the data stream 12 that are not of interest to the pattern-recognition processor 14 may be referred to as "invalid" bytes.

FIG. 13 also illustrates a chip select bus 104, a control bus 106, and an address bus 108 providing address signals to the pattern-recognition processor 14. An address decoder 110 is also illustrated to decode the signals from the address bus 108 and output chip select signals 112. The control bus 106 provides a read strobe 114 and a write strobe 116 to the pattern-recognition processor 14. The address bus 114 may provide three address signals A5, A6, and A7 to the address decoder 110, which outputs decoded chip select signals 112, as indicated by the lines CSe11 through CSe18. The chip select bus 104 then provides the chip select signals 112, such as chip select CSe17, to the pattern-recognition processor 14.

In some embodiments, the chip select logic, e.g., the address decoder 110, may include "universal select" logic. In such an embodiment, a universal select signal may be provided by the address bus 108 and the address decoder 110, as illustrated by a fourth address signal A8, and provided to an inverter 118. Additionally, this fourth address signal A8 may be included to indicate the use of universal select (1) or a chip select (0).

The address bus 108 also provides signals on address lines A0, A1, A2, A3, and A4 to the pattern-recognition processor 14, as illustrated by lines 120. As discussed further below, signals provided on lines A0, A1, A2, A3, and A4 are used to signal the validity inherent to Byte 0, Byte 1, Byte 2, and Byte 3 transferred on the data bus 100. The address lines A0, A1, A2, A3, and A4 may be referred to as "Byte-Valid" lines.

Figure 14:
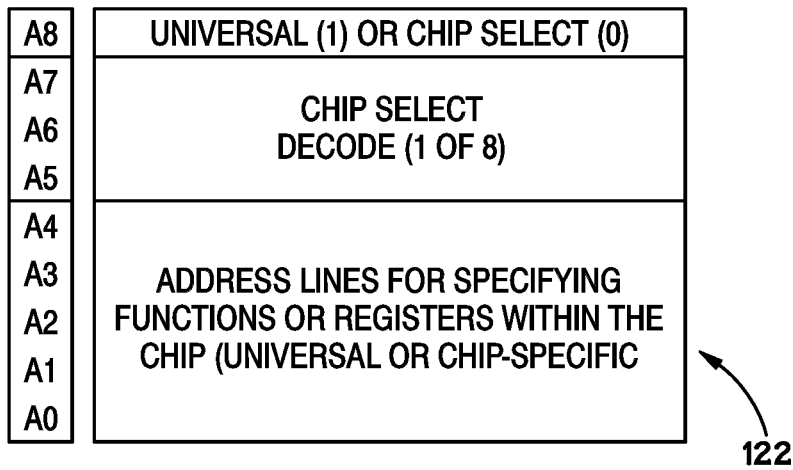
FIG. 14 is a table summarizing address decoding signals lines shown in FIG. 13 in accordance with an embodiment of the present invention.

The address signals A0-A8 depicted in FIG. 13 and discussed above are summarized in the table 122 shown in FIG. 14. It should be appreciated the address signals A0-A8 are merely representative of one embodiment, and other embodiments may use different numbers, arrangements, and designations of address lines and signals to implement the techniques described herein.

As described above, the pattern-recognition processor 14 may be a "byte-oriented" processor such that the processor sequentially processes each byte (8-bits) wide data input in the input data stream. The data bus 100, however, provides four bytes Byte 0, Byte 1, Byte 2, and Byte 3 to the pattern-recognition processor 14. To achieve inter-operability with the 32-bit data bus 100, the address signals A3, A2, A1, and A0 indicate which of the bytes Byte 0, Byte 1, Byte 2, and Byte 3 of the 32-bit data are valid. By providing a signal on each of the address lines A3, A2, A1, and A0, e.g., turning each address line active or inactive, the validity of each byte Byte 0, Byte 1, Byte 2 and Byte 3 is indicated. The "Byte-Valid" signals A3, A2, A1, A0 and the data signals 102 may be processed by a variable width data control logic 124 of the pattern-recognition processor 14.

Figure 15:
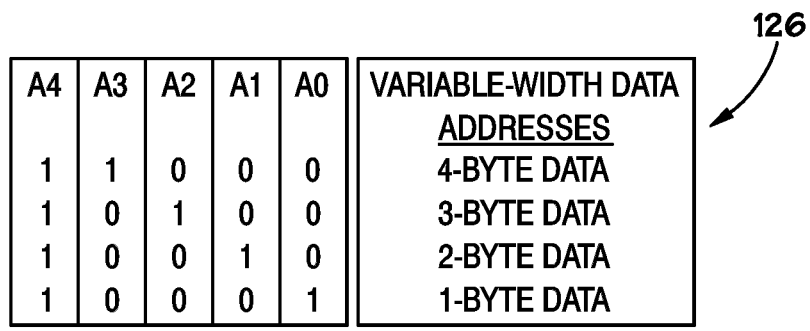
FIG. 15 is a table illustrating a schema for "Byte-Valid" signals in accordance with an embodiment of the present invention.

For example, if the data to be searched in the data stream 12 transferred over the data bus 100 in a bus cycle is represented as one byte, the address signal AO is active, and address signals A1, A2, and A3 are inactive. If the data to be searched in the data stream 12 transferred over the data bus 100 in a bus cycle is represented as two bytes of data, the address signal A1 is active and address signals A0, A2, and A3 are inactive. Similarly, address signal A2 is active if the data transferred over the data bus 100 in a bus cycle is three bytes, and address signal A3 is ON if the data is four bytes. FIG. 15 is a table 126 illustrating this schema for the "Byte-Valid" signals A3, A2, A1, and A0.

This schema illustrated in table 126 of FIG. 15 and discussed above allows any one byte, two byte, three byte, or four byte or greater data to be transferred over the 32-bit data bus 100 and then each byte of the data may be sequentially processed by the pattern-recognition processor 14. Data in the data stream 12 larger than four bytes may be represented by consecutive 32-bit bus cycles, using the A0, A1, A2, and A3 address signal schema in table 126 to indicate consecutive valid bytes. For example, five bytes of searchable data might be transferred as four bytes on one bus cycle, indicated by an active address signal A3, and a subsequent byte transferred on the next bus cycle, indicated by an active address signal A0.

In a similar manner, data in the data stream 12 smaller than the 32-bit wide data bus 100 may also be "packed" together to achieve usage of the full width of the data bus 100. For example, a one byte term and a three byte term may be transferred on one 32-bit bus cycle, with the address signal A3 active to indicate four valid bytes in that bus cycle.

It should be appreciated that the techniques discussed herein are applicable to any size data bus. A 16-bit data bus may use two "Byte-Valid" signals to indicate if one byte in the bus cycle is valid or if two bytes in the bus cycle are valid. Similarly, a 64-bit data bus may use eight "Byte-Valid" signals to indicate the number of valid bytes in the data transferred on each bus cycle. The "Byte-Valid" signal schema may be scaled to any bus size and device.

Figure 16:
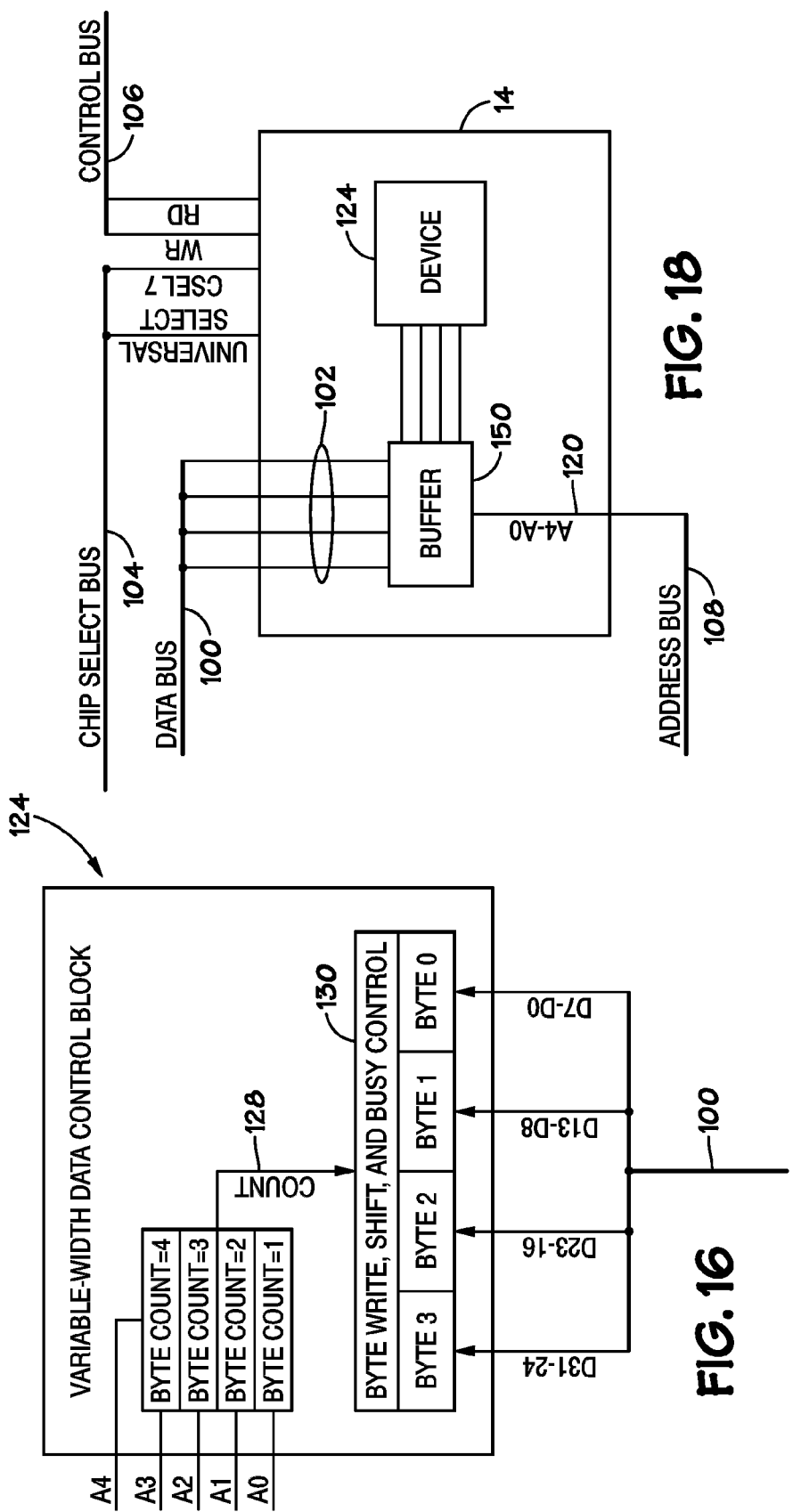
FIG. 16 is a logic diagram illustrating the variable width data control block of the FIG. 13 in accordance with an embodiment of the present invention.

FIG. 16 is a logic diagram of one potential variable width data control logic 124 for the pattern-recognition processor 14. In one embodiment, the data control logic 124 may be implemented in the pattern-recognition processor 14. The variable width data control logic 124 receives the data stream 12 over the 32-bit data bus, as indicated by line 100. As discussed above, any width data bus may be used. The 32-bit wide data bus 100 transfers the four bytes Byte 0, Byte 1, Byte 2, and Byte 3.

The address bus 108 of FIG. 13 provides the address signals A0, A1, A2, A3, and A4 to the variable width data control logic 124, indicating the number of valid bytes in the data stream. The variable width data control logic 124 may process the address signals and provide a count 128 indicating the number of bytes in the data stream, such as 1, 2, 3, or 4 depending on the signals supplied on the address lines A0, A1, A2 and A3. Additionally, the variable width data control logic 124 includes a control unit 130 that receives the count 128 and processes the data stream 12 according to the number of valid bytes indicated by the count 128. For example, to provide data to the recognition module 22 of the pattern-recognition processor 14, the control unit 130 may process each byte of the data stream sequentially, such as by using a shift register or a first-in/first-out (FIFO) register. To indicate the number of valid bytes, the control unit 130 can write the valid bytes to the shift register or FIFO register by using the "Byte-Valid" information provided by the count 128. Thus, the variable width data control logic 124 determines which bytes are valid and can proceed to process the valid bytes sequentially.

In the schema described above and illustrated in FIG. 15, the bytes representing the data stream 12 are arranged such that all valid bytes are consecutive and there are no unused spaces between the bytes. In this arrangement, the bytes may be referred to as "packed," meaning that all valid bytes of terms in the data stream 12 are arranged in the lowest position to the highest position, or alternatively, from the highest position to the lowest position. Any invalid bytes remain after the valid bytes, at the highest position, or, alternatively, at the lowest position.

FIG. 17 is a table 140 of an alternative schema for variable width data input in accordance with another embodiment of the present invention. As described above, the schema uses address signals A3, A2, A1, and A0, and a chip select signal (A4), e.g., "Byte-Valid" signals 120, to indicate the validity of bytes in the data stream 12 transferred over a 32-bit data bus 100. As also stated above, the schema may be extended to any width bus, such as 16-bit, 64-bit, etc. In contrast to the schema depicted in FIG. 15, however, the schema of FIG. 17 enables transmission of data over the data bus 100 without "packing" the valid bytes in the data stream as described above. As depicted in FIG. 17, the address signals A3, A2, A1, and A0 indicate which one of the four bytes in the 32-bit wide data stream 12 are valid, eliminating the need for "packing" the valid bytes consecutively from a lowest to highest position or vice-versa.

As illustrated in row 142 of FIG. 17, if none of the bytes are valid, the address signals A0, A1, A2, and A3 are inactive. The address signals A0, A1, A2, and A3 each indicate the validity of Byte 0, Byte 1, Byte 2, and Byte 3 respectively. However, in addition to the individual validity of Byte 0, Byte 1, Byte 2, and Byte 3, combinations of the address signals A0, A1, A2, and A3 can be used to indicate the validity of any combination of Byte 0, Byte 1, Byte 2, and Byte 3. For example, if Byte 0 and Byte 1 of the 32-bit data are valid, the A0 address signal is active and the A1 address signal is active and the A2 address signal and the A3 address signal are inactive, as indicated in row 144. In another example, if Byte 0 and Byte 3 are valid, and Byte 1 and Byte 2 are invalid, the A0 address signal and the A3 address signal are active and the A1 address signal and the A2 address signal are inactive, as indicated in row 146.

If four valid bytes are sent over the 32-bit data bus 100, all four bytes Byte 0, Byte 1, Byte 2, and Byte 3 are valid. In this instance, all four address signals A0, A1, A2, and A3 are active, indicating that Byte 0, Byte 1, Byte 2, and Byte 3 are valid, as indicated by row 148. In this manner, any combination of valid bytes may be represented by the combination of address signals A0, A1, A2, and A3. It should be appreciated that this schema is merely representative of one embodiment, and other embodiments may use different schemas or combinations of address signals to indicate the validity of bytes transferred on the data bus 100.

In contrast to an embodiment using the schema depicted in FIG. 15, the schema depicted in FIG. 17 allows use of one or more of the bytes Byte 0, Byte 1, Byte 2, and Byte 3 to represent additional data that is not searched by the pattern-recognition processor 14. For example, if the data bus 100 receives data from a network processor, one or more bytes may be reserved for a transmission byte indicating a network identification or transmission status. In such an embodiment, the data may be written to the data bus 100 without any shifting of bytes to different positions to "pack" the valid bytes, eliminating the need for such additional processing. For example, a transmission byte may be written to any of the bytes Byte 0, Byte 1, Byte 2, or Byte 3 of the 32-bit data bus 100. Using the schema described in FIG. 17, this transmission byte may be indicated as invalid, regardless of its position in the data stream 12, and the other bytes in the data stream indicated as valid.

The embodiments in FIG. 17 also may use a sequential register or FIFO register to process each of the incoming bytes on the data bus 100 sequentially, in combination with the validity of the bytes indicated by the address signals A0, A1, A2, and A3. For example, in one of the examples discussed above, if Byte 0 and Byte 3 are valid, and Byte 1 and Byte 2 are invalid, the variable width data control logic 124 may provide Byte 0, ignore Byte 1, ignore Byte 2, and provide Byte 3. In some embodiments, the control unit 130 of the variable width data control logic 124 may include a "wait" or "busy" signal to indicate that it is processing bytes. In other embodiments, no such signal is necessary if the pattern-recognition processor 14 is processing bytes faster than provided by the data bus 100.

In addition to the techniques described above, certain embodiments may also include a FIFO buffer capable of accepting "bursts" of data to store many writes of data transferred over the data bus 100. Such an embodiment is illustrated in FIG. 18. A FIFO buffer 150 may be used between the data bus 100 and the variable width control logic 124, and, as discussed further below, may store the data from the data bus 100 (lines 102) and the "Byte-Valid" signals A0, A1, A2, and A3 (indicated by line 120) from the control bus 106. For example, in an embodiment having a 32-bit data bus 100, the FIFO buffer 150 may be a 36-bit buffer.

The FIFO buffer 150 receives input from the data bus 100 and the address bus 108 and outputs the data from the data stream 12 and the "Byte-Valid" address signals 120 to the variable width data control logic 124. The FIFO buffer 150 can receive "bursts" of data from the data bus 100, buffering the data until the variable width data control logic 124 is ready to accept the next data cycle. It should be appreciated that the FIFO buffer 150 may be used with any width data bus, such as 16-bit, 64-bit, or wider data bus, and the FIFO buffer 150 may be scaled to match the width of the data bus.

Figure 19:
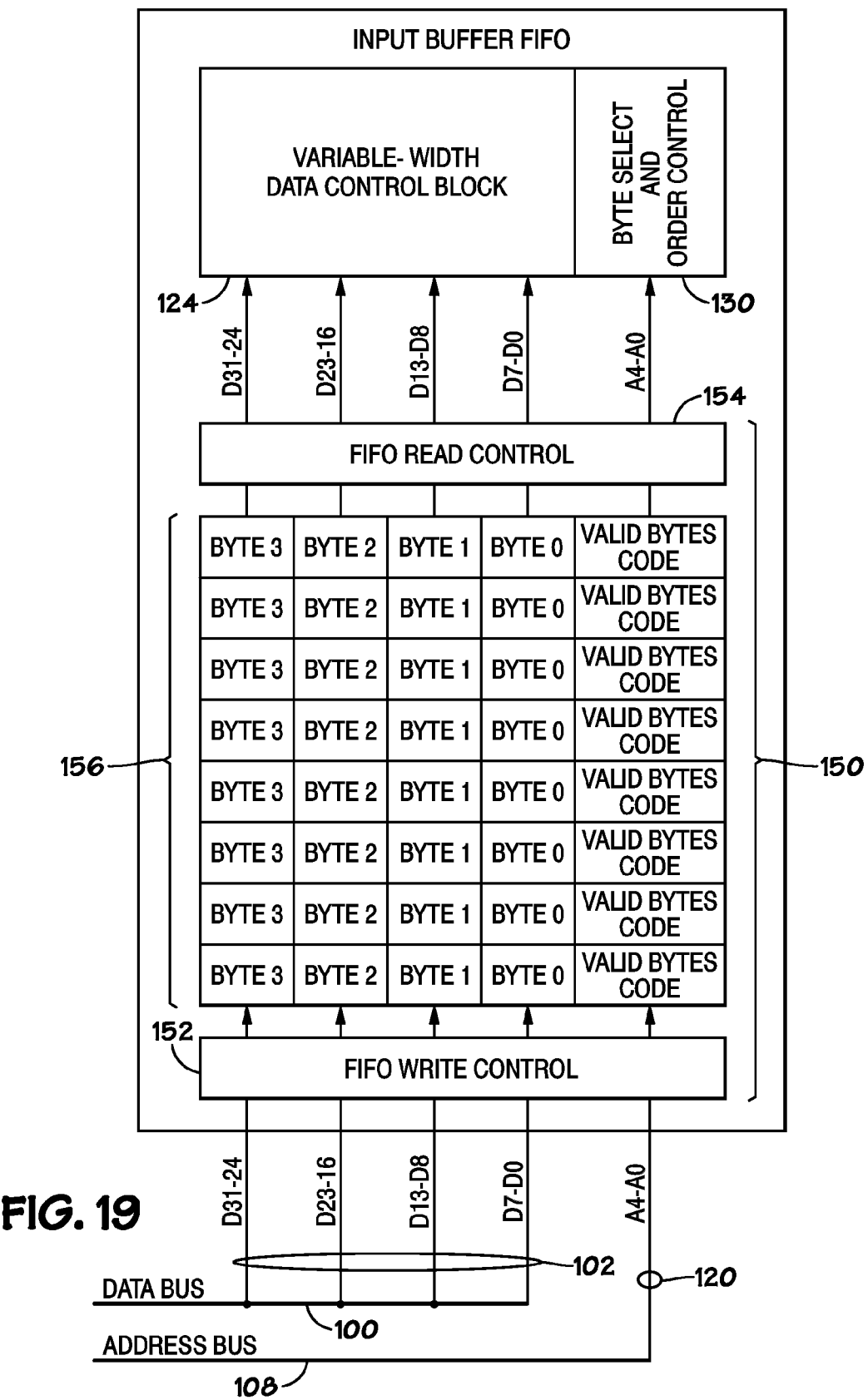
FIG. 19 is a logic diagram illustrating operation of the buffer of FIG. 18 in accordance with an embodiment of the present invention.

FIG. 19 illustrates further details of the FIFO buffer 150 in accordance with an embodiment of the present invention. The FIFO buffer 150 may include FIFO write control logic 152 and FIFO read control logic 154. The data stored in the buffer is indicated by "rows" (e.g., spaces) 156. The "rows" 156 in the FIFO buffer 150 may be implemented via a series of shift registers. As illustrated in FIG. 19, each "row" 156 in the FIFO buffer 150 can store each byte, i.e., Byte 0, Byte 1, Byte 2, and Byte 3, received from the data bus 100 and can also store the "Byte Valid Indicators" received from the address bus 108. For example, in the schemas discussed above, the Byte Valid Indicators may include indicators from address signals A0, A1, A2, and A3 that indicate the number of valid bytes in the data or the validity of each of Byte 0, Byte 1, Byte 2, and Byte 3. The variable width control logic 124 and control unit 130 receive the output from the FIFO Read Control 154 of the FIFO buffer 150.

The FIFO buffer 150 receives the four bytes, again referred to as Byte 0, Byte 1, Byte 2, and Byte 3, from the 32-bit data bus 100, and receives the address signals A0, A1, A2, and A3 from the address bus 108. The FIFO write control logic 152 controls the data received from the data bus 100 and writes the received data into the next available "row" or space in the FIFO buffer 150. The FIFO read control logic 154 outputs the first FIFO "row," including the Byte-Valid bits supplied by the address signals A0, A1, A2, and A3, to the variable width data control logic 124 that includes the control unit 130. The variable width data control logic 124 and the control unit 130 can sequentially provide the valid bytes of the 32-bit wide data to the recognition module or other component of the pattern-recognition processor 14.

The FIFO write control logic 152 of the FIFO buffer 150 may also indicate to the data bus 100 that the buffer is full or able to accept more data from the data bus 100. Use of the FIFO buffer 150 provides the pattern-recognition processor 14 independent operation from the other components in a system using the processor 14, as the FIFO buffer 150 ensures that the processor 14 is supplied with data, i.e., valid bytes, without synchronization with the data bus 100 or any other component providing data to the pattern-recognition processor 14.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method, comprising:
receiving, at variable width control logic, a data stream via a data bus having a first width; and
processing, at a processor, the data stream in sequential units having a second width, less than the first width.

2. The method of claim 1, comprising receiving, at the variable width control logic, a indicator of what portions of the data stream are valid.

3. The method of claim 2, wherein processing comprises processing only the portions of the data stream that are valid.

4. The method of claim 1, wherein processing comprises processing the data stream in sequential units have a width equal to one byte.

5. The method of claim 4, comprising receiving, at the variable width control logic, a byte valid signal indicating what bytes of the data stream are valid.

6. The method of claim 1, wherein processing at a processor comprises searching for a pattern in the data stream at a pattern-recognition processor.

7. A method, comprising:
receiving a plurality of data bytes at variable width control logic, simultaneously;
receiving one or more byte valid signals at the variable width control logic together with the plurality of data bytes, the one or more byte valid signals indicating the validity of each of the data bytes; and
processing the valid data bytes sequentially.

8. The method of claim 7, wherein the plurality of data bytes comprises one of 2 bytes, 4 bytes or 8 bytes.

9. The method of claim 7, comprising storing the valid data bytes before processing the valid data bytes sequentially.

10. The method of claim 9, wherein storing comprises storing the valid data bytes in a first-in-first-out register.

11. The method of claim 7, wherein processing comprises searching the valid data bytes for a pattern.

12. The method of claim 11, wherein searching comprises comparing the valid data bytes to a search term of a search criterion.

* * * * *